United States Patent
Noda

(10) Patent No.: US 10,958,814 B2
(45) Date of Patent: Mar. 23, 2021

(54) IMAGE PICKUP APPARATUS INCLUDING SEALING MEMBER

(71) Applicant: CANON KABUSHIKI KAISHA, Tokyo (JP)

(72) Inventor: Atsuto Noda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/583,769

(22) Filed: Sep. 26, 2019

(65) Prior Publication Data

US 2020/0106934 A1    Apr. 2, 2020

(30) Foreign Application Priority Data

Sep. 27, 2018  (JP) .............................. JP2018-182376

(51) Int. Cl.
*H04N 5/225* (2006.01)
*G03B 17/02* (2021.01)
*G02B 27/00* (2006.01)

(52) U.S. Cl.
CPC ....... *H04N 5/2254* (2013.01); *G02B 27/0006* (2013.01); *G03B 17/02* (2013.01); *G03B 2217/002* (2013.01)

(58) Field of Classification Search
CPC ............. H04N 5/2254; H04N 5/22541; G02B 27/0006; G03B 17/02
See application file for complete search history.

(56) References Cited

U.S. PATENT DOCUMENTS

| 2003/0218685 A1* | 11/2003 | Kawai | H04N 5/22521 |
| | | | 348/340 |
| 2006/0044447 A1* | 3/2006 | Takagi | G02B 7/006 |
| | | | 348/335 |
| 2008/0180562 A1* | 7/2008 | Kobayashi | H04N 5/2254 |
| | | | 348/340 |
| 2011/0102652 A1* | 5/2011 | Lu | H04N 5/2253 |
| | | | 348/294 |
| 2011/0150461 A1* | 6/2011 | Hase | H04N 5/2171 |
| | | | 396/535 |

(Continued)

FOREIGN PATENT DOCUMENTS

JP            5295304 B       9/2013

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

An image pickup apparatus capable of maintaining accuracy of positioning a sealing member and also applying a proper elastic repulsion force to an image pickup device. A first holding member holds an image pickup device, a first optical member is disposed forward of the device in a first direction orthogonal to an image pickup surface of the device, and a sealing member is sandwiched and held between the first optical member and the device. The first holding member has an opening portion for guiding light flux having passed through a photographing optical system to the device, and an abutment surface brought into contact with part of the first optical member. The sealing member has protrusions each extending forward in the first direction, along an outer shape of the first optical member inside the opening portion of the first holding member, as viewed in the first direction.

6 Claims, 8 Drawing Sheets

(56) References Cited

U.S. PATENT DOCUMENTS

2012/0281282 A1* 11/2012 Kudoh .................. H04N 5/225
  359/513
2016/0178923 A1* 6/2016 Hayashi ............... H04N 5/2328
  359/557

* cited by examiner

IMAGE PICKUP APPARATUS INCLUDING SEALING MEMBER

BACKGROUND OF THE INVENTION

Field of the Invention

The present invention relates to an image pickup apparatus, such as a digital camera and a video camera, including a sealing member.

Description of the Related Art

Image pickup apparatuses, such as a digital camera and a video camera, include one having an optical filter, such as a lowpass filter and a glass plate, disposed forward of an image pickup device in an optical axis direction, for controlling the wavelength of incident light. In a case where the optical filter is disposed forward of the image pickup device, a sealing member formed of an elastic material, such as rubber, is disposed between the image pickup device and the optical filter to prevent adhesion of foreign matter, such as dust, to an image pickup surface of the image pickup device. For example, Japanese Patent No. 5295304 discloses an arrangement in which the optical filter is positioned by an image pickup device-holding frame for holding the image pickup device, and the sealing member is provided with position-regulating protruding portions at respective locations corresponding to four sides of the optical filter so as to regulate the position of the sealing member. According to the arrangement disclosed in Japanese Patent No. 5295304, it is possible to position the sealing member with high accuracy even when position adjustment and tilt adjustment of the image pickup device are performed.

However, the arrangement disclosed in Japanese Patent No. 5295304 requires the optical filter to have a sufficient thickness. That is, in a case where the optical filter is thin, a problem is caused that a hitching amount of each position-regulating protruding portion provided on the sealing member with respect to the optical filter in the optical axis direction is insufficient, and further, it is impossible to provide a sufficient clearance from the image pickup device-holding frame. Particularly, if the clearance between the sealing member and the image pickup device-holding frame is insufficient, in a case where the amount of deformation of the sealing member is increased e.g. due to position adjustment of the image pickup device, there is a possibility that the protruding portions of the sealing member and the image pickup device-holding frame interfere with each other, causing an elastic repulsion force to be applied to the image pickup device more than required. If the elastic repulsion force is applied to the image pickup device more than required, there is a fear that the image pickup device is peeled from the image pickup device-holding frame to which it is bonded.

SUMMARY OF THE INVENTION

The present invention provides an image pickup apparatus capable of maintaining accuracy of positioning a sealing member and also applying a proper elastic repulsion force to an image pickup device.

The present invention provides an image pickup apparatus comprising an image pickup device, a first holding member configured to hold the image pickup device, a first optical member that is disposed forward of the image pickup device in a first direction orthogonal to an image pickup surface of the image pickup device, and a sealing member that is sandwiched and held between the first optical member and the image pickup device, wherein the first holding member includes an opening portion for guiding light flux having passed through a photographing optical system to the image pickup device, and an abutment surface that is brought into contact with part of the first optical member, and wherein the sealing member has protrusions each extending forward in the first direction, along an outer shape of the first optical member inside the opening portion of the first holding member, as viewed in the first direction.

According to the present invention, it is possible to realize the image pickup apparatus capable of maintaining the accuracy of positioning the sealing member and applying a proper elastic repulsion force to the image pickup device.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. Here, a digital camera having a retractable (extendable and retractable) photographing optical system will be described as an image pickup apparatus.

Figure 1:
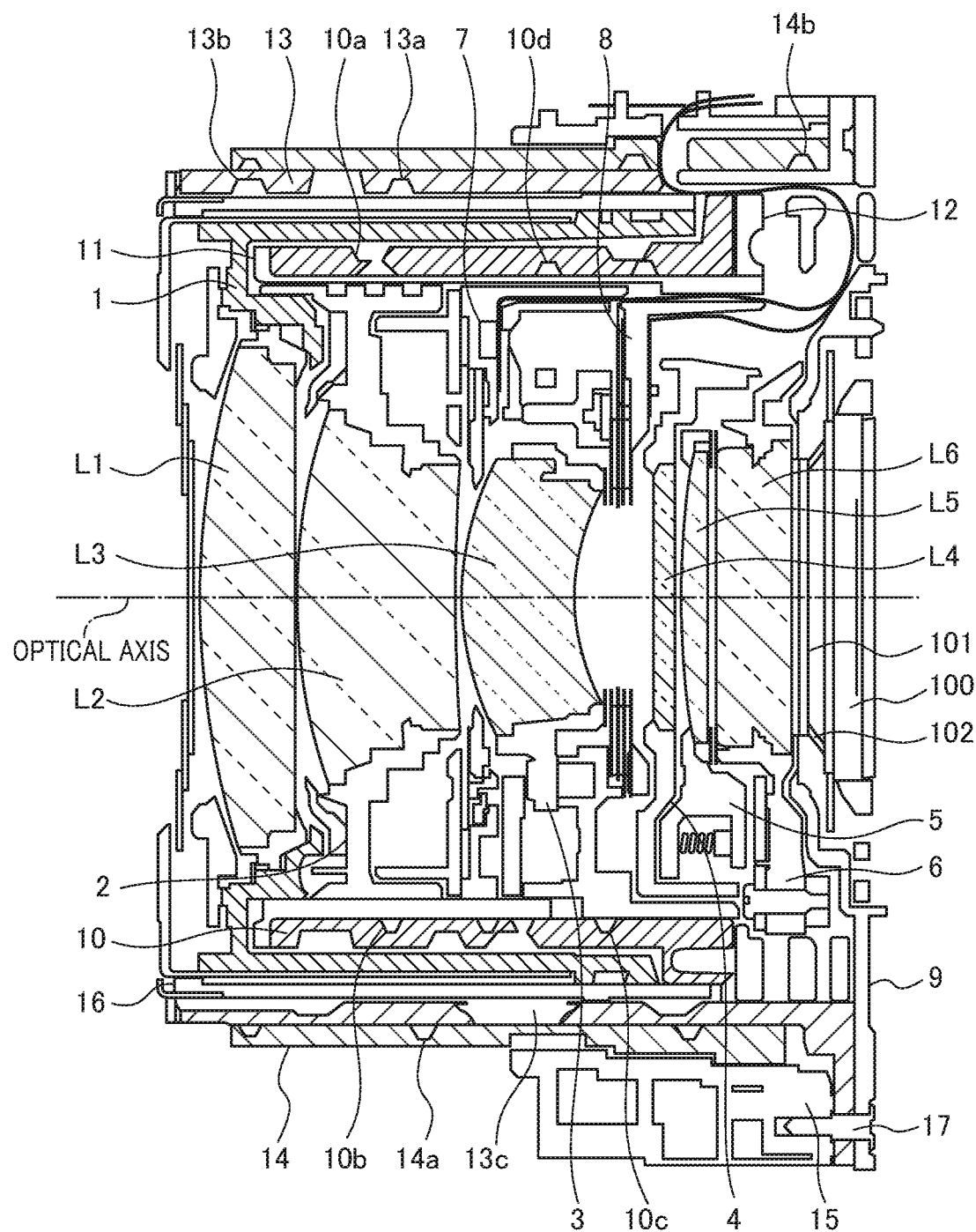
FIG. 1 is a cross-sectional view of a photographing optical system of an image pickup apparatus according to an embodiment, in a retracted state.
Figure 2:
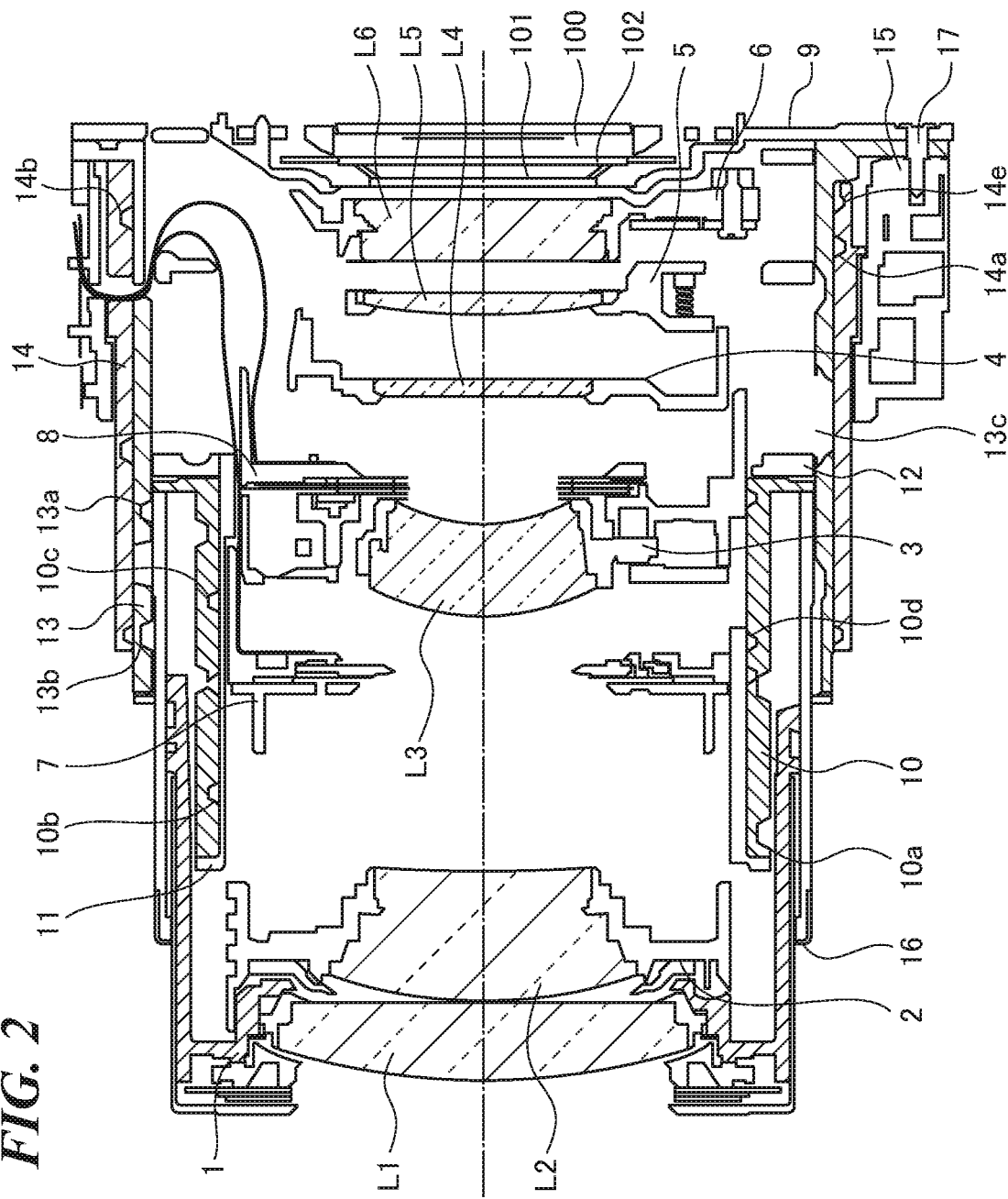
FIG. 2 is a cross-sectional view of the photographing optical system in a photographing state.
Figure 3:
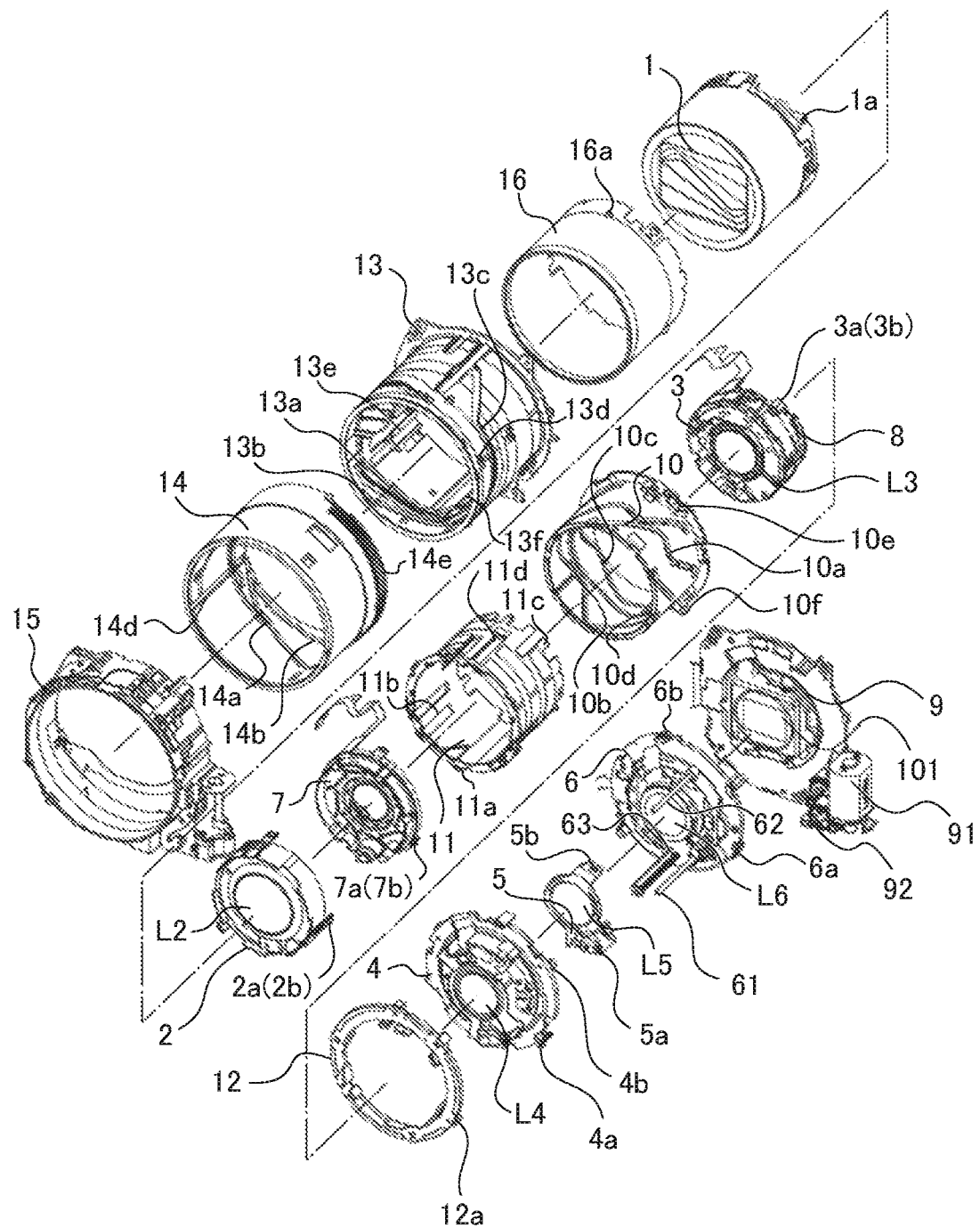
FIG. 3 is an exploded perspective view of the photographing optical system.

FIG. 1 is a cross-sectional view showing a structure of the photographing optical system of the image pickup apparatus when retracted (in a retracted state). FIG. 2 is a cross-sectional view showing the structure of the photographing optical system of the image pickup apparatus when photographing is performed (in an extended state). Note that in FIGS. 1 and 2, hatching indicating cross-sections of some of members of the photographing optical system is omitted from illustration. FIG. 3 is an exploded perspective view of the photographing optical system of the image pickup apparatus.

The photographing optical system includes a first-group barrel 1, a second-group barrel 2, an image-blur correction unit 3, a fourth-group holding frame 4, a fifth-group holding frame 5, and a sixth-group holding frame 6. Further, the photographing optical system includes a diaphragm unit 7, a shutter ND unit 8, an image pickup device-holding frame 9 (first holding member), a cam barrel 10, a rectilinear motion barrel 11, a rectilinear motion plate 12, a fixed barrel 13, a drive barrel 14, a fixed cover barrel 15, and a movable cover barrel 16.

The photographing optical system is a six-group lens optical system having a first-group lens L1, a second-group lens L2, a third-group lens L3, a fourth-group lens L4, a fifth-group lens L5, and a sixth-group lens L6, Light flux having passed through the photographing optical system forms an image on an image pickup device 100 held by the image pickup device-holding frame 9. The image pickup device-holding frame 9 holds the image pickup device 100 and an optical filter 101 (first optical member). The image pickup device-holding frame 9 is formed with an opening portion 9a having a circular shape (see FIG. 4), for guiding light flux having passed through the photographing optical system to an image pickup surface of the image pickup device 100. A sealing member 102 formed of an elastic member, such as rubber, is disposed between the image pickup device 100 and the optical filter 101.

The first-group barrel 1 holds the first-group lens L1. Cam pins 1a provided at six locations on an inner peripheral surface of the first-group barrel 1 are engaged with cam grooves 10a, formed in an outer peripheral surface of the cam barrel 10. Further, three rectilinear grooves (not shown) formed in the inner peripheral surface of the first-group barrel 1 are engaged with rectilinear keys 11a provided on an outer peripheral surface of the rectilinear motion barrel 11. The second-group barrel 2 holds the second-group lens L2. Three cam pins 2a provided on an outer peripheral surface of the second-group barrel 2 are engaged with cam grooves 10b formed in an inner peripheral surface of the cam barrel 10. Further, rectilinear keys 2b provided at the same locations as the cam pins 2a on the second-group barrel 2 are engaged with rectilinear grooves 11b formed in the rectilinear motion barrel 11.

The image-blur correction unit 3 holds the third-group lens L3. The image-blur correction unit 3 corrects image blur of an optical image formed on the image pickup device 100 by moving the third-group lens L3 within a plane orthogonal to the optical axis. Cam pins 3a provided at three locations on an outer peripheral surface of the image-blur correction unit 3 are engaged with cam grooves 10c formed in the inner peripheral surface of the cam barrel 10. Further, rectilinear keys 3b provided at the same locations as the cam pins 3a on the image-blur correction unit 3 are engaged with rectilinear grooves 11c formed in the rectilinear motion barrel 11.

The fourth-group holding frame 4 holds the fourth-group lens L4. Cam pins 4a provided at three locations on an outer peripheral surface of the fourth-group holding frame 4 are engaged with cam grooves 14a formed in an inner peripheral surface of the drive barrel 14. Further, three rectilinear keys 4b provided on the outer peripheral surface of the fourth-group holding frame 4 are engaged with rectilinear grooves 13d formed in the fixed barrel 13. Note that the fixed barrel 13 and the fixed cover barrel 15 are fixed to the image pickup device-holding frame 9 with screws 17.

The fifth-group holding frame 5 holds the fifth-group lens L5. A positioning portion 5a and a shake stopper 5b, provided on the fifth-group holding frame 5, are engaged with a main guide bar 61 and a sub guide bar 62, arranged on the sixth-group holding frame 6, respectively, whereby the fifth-group holding frame 5 is supported by the sixth-group holding frame 6 such that the fifth-group holding frame 5 is movable in the optical axis direction (first direction). Further, a rack (not shown) is arranged on the fifth-group holding frame 5 and is screwed with a screw of a stepping motor 63 as drive means arranged on the sixth-group holding frame 6. As the fifth-group holding frame 5 is driven by the output of the stepping motor 63, the fifth-group holding frame 5 is moved in the optical axis direction without being rotated by cooperative action of the positioning portion 5a and the stopper 5b and cooperative action of the main guide bar 61 and the sub guide bar 62.

The sixth-group holding frame 6 holds the sixth-group lens L6. Cam pins 6a provided at three locations on an outer peripheral surface of the sixth-group holding frame 6 are engaged with cam grooves 14b formed in the inner peripheral surface of the drive barrel 14. Further, rectilinear keys 6b provided at three locations on the outer peripheral surface of the sixth-group holding frame 6 are engaged with rectilinear grooves 13e formed in the fixed barrel 13. Cam pins 7a provided at three locations on an outer peripheral surface of the diaphragm unit 7 are engaged with cam grooves 10d formed in the inner peripheral surface of the cam barrel 10. Further, rectilinear keys 7b provided at the same positions as the cam pins 7a on the diaphragm unit 7 are engaged with rectilinear grooves 11d formed in the rectilinear motion barrel 11. The shutter ND unit 8 is fixed to the image-blur correction unit 3 with screws (not shown).

Cam pins 10e provided at three locations on the outer peripheral surface of the cam barrel 10 are engaged with cam grooves 13a formed in an inner peripheral surface of the fixed barrel 13. Drive pins 10f formed at three locations on the outer peripheral surface of the cam barrel 10 extend through through grooves 13c formed in the fixed barrel 13 and are engaged with rectilinear grooves 14d formed in the inner peripheral surface of the drive barrel 14. The cam barrel 10 is rotatably supported by the rectilinear motion barrel 11 and the rectilinear motion plate 12 and can be moved in the optical axis direction in unison with the rectilinear motion barrel 11. The movable cover barrel 16 is fixed on the cam barrel 10 by means, not shown. Three cam pins 16a provided on an outer peripheral surface of the movable cover barrel 16 are inserted and fitted in cam grooves 13b formed in the fixed barrel 13 such that slight clearance is formed therebetween.

The rectilinear motion barrel 11 regulates rectilinear movement of the first-group barrel 1, the second-group barrel 2, the image-blur correction unit 3, and the diaphragm unit 7. Further, the rectilinear motion barrel 11 is fixed to the rectilinear motion plate 12 by means, not shown. Rectilinear keys 12a provided at three locations on an outer peripheral surface of the rectilinear motion plate 12 are engaged with rectilinear grooves 13f formed in the fixed barrel 13. A gear portion 14e provided on an outer peripheral surface of the drive barrel 14 is connected to a drive unit having a DC motor 91 and a plurality of gears 92. As the drive barrel 14 is rotated by the output of the drive unit, the cam barrel 10 is moved in the optical axis direction while being rotated, by cooperative action of the cam pins 10e of the cam barrel 10 and the cam grooves 13a of the fixed barrel 13 and cooperative action of the drive pins 10f of the cam barrel 10 and the rectilinear grooves 14d of the drive barrel 14.

The first-group barrel 1 is moved in the optical axis direction without being rotated, by cooperative action of the cam pins 1a of the first-group barrel 1 and the cam grooves 10a of the can barrel 10 and cooperative action of the rectilinear grooves (not shown) of the first-group barrel 1 and the rectilinear keys 11a of the rectilinear motion barrel 11. The second-group barrel 2 is moved in the optical axis direction without being rotated, by cooperative action of the cam pins 2a of the second-group barrel 2 and the cam grooves 10b of the cam barrel 10 and cooperative action of the rectilinear keys 2b of the second-group barrel 2 and the rectilinear grooves 11b of the rectilinear motion barrel 11. The image-blur correction unit 3 is moved in the optical axis direction without being rotated, by cooperative action of the cam pins 3a of the image-blur correction unit 3 and the cam grooves 10c of the cam barrel 10 and cooperative action of the rectilinear keys 3b of the image-blur correction unit 3 and the rectilinear grooves 11c of the rectilinear movable barrel 11.

The fourth-group holding frame 4 is moved in the optical axis direction without being rotated by cooperative action of the cam pins 4a of the fourth-group holding frame 4 and the cam grooves 14a of the drive barrel 14 and cooperative action of the rectilinear keys 4b of the fourth-group holding frame 4 and the rectilinear grooves 13d of the fixed barrel 13. The sixth-group holding frame 6 is moved in the optical axis direction without being rotated by cooperative action of the cam pins 6a of the sixth-group holding frame 6 and the cam grooves 14b of the drive barrel 14 and cooperative action of the rectilinear keys 6b of the sixth-group holding frame 6 and the rectilinear grooves 13e of the fixed barrel 13. The diaphragm unit 7 is moved in the optical axis direction without being rotated by cooperative action of the cam pins 7a of the diaphragm unit 7 and the cam grooves 10d of the cam barrel 10 and cooperative action of the rectilinear keys 7b of the diaphragm unit 7 and the rectilinear grooves 11d of the rectilinear motion barrel 11.

Figure 4:
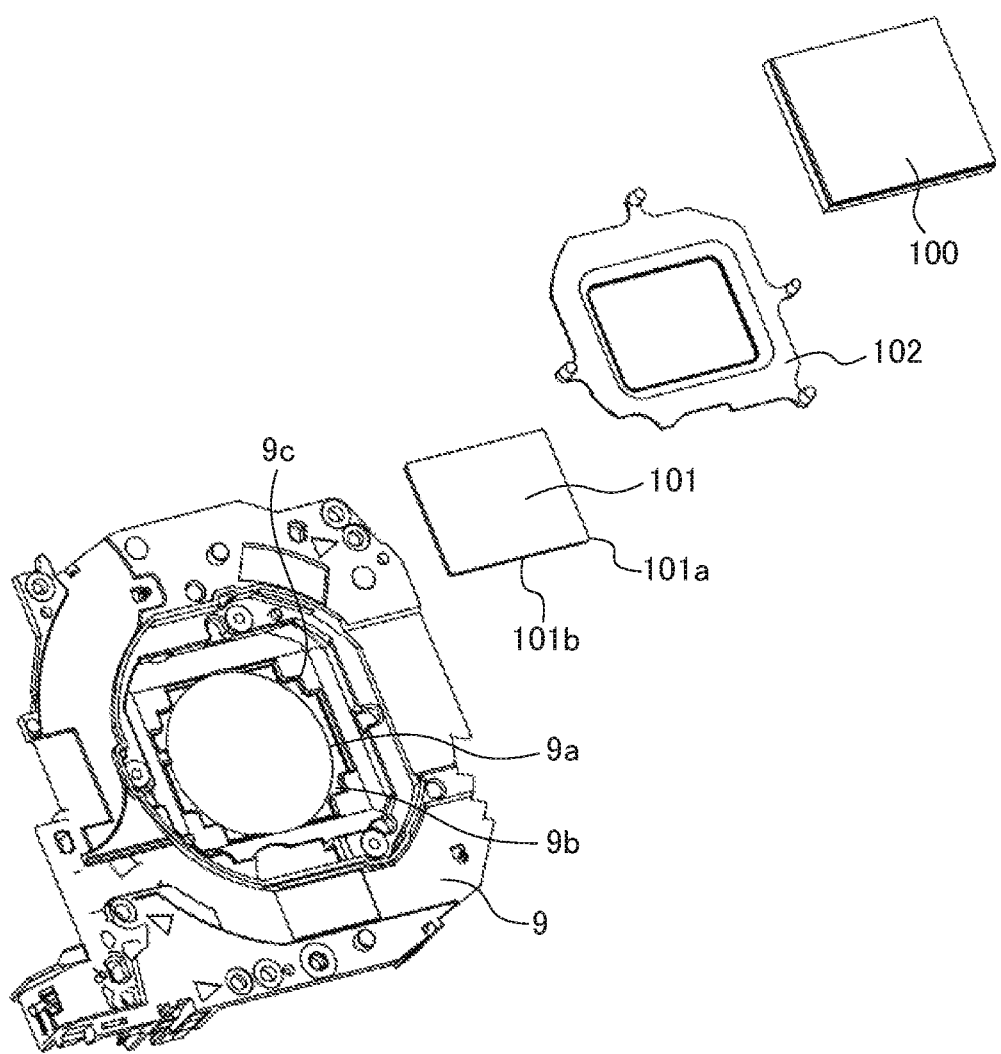
FIG. 4 is an exploded perspective view of an image pickup device and associated components of the photographing optical system.
Figure 5A:
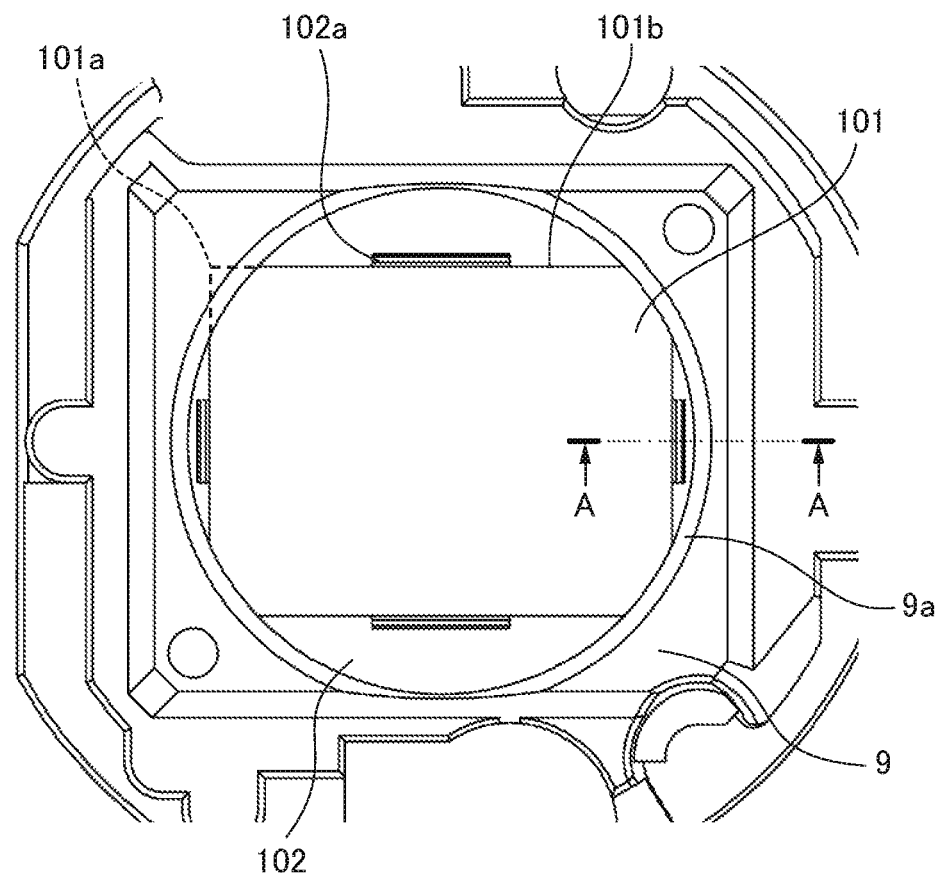
FIGS. 5A and 5B are a front view and a cross-sectional view each showing a structure surrounding the image pickup device according to a first embodiment.
Figure 5B:
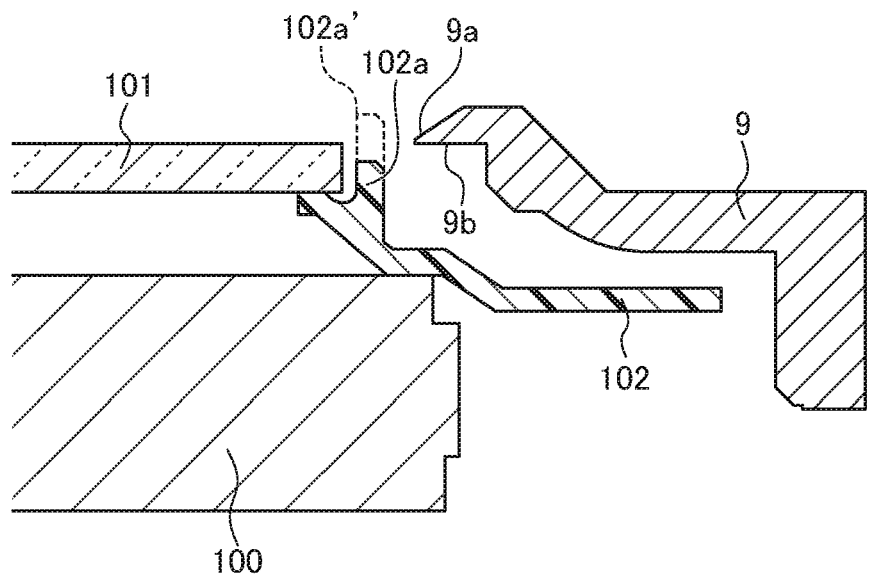

Next, a structure surrounding the image pickup device 100 according to a first embodiment will be described. FIG. 4 is an exploded perspective view useful in explaining the structure surrounding the image pickup device 100 according to the first embodiment. FIG. 5A is a front view of the image pickup device 100 and components associated therewith, as viewed from the object side in the optical axis direction, and FIG. 5B is a cross-sectional view taken along A-A in FIG. 5A.

The optical filter 101 has a rectangular shape having four corners 101a and four sides 101b. The image pickup device-holding frame 9 has an abutment surface 9b which is brought into contact with part (more specifically, the four corners 101a and their vicinities) of a front surface (surface on an object side) of the optical filter 101, for holding the optical filter 101. Further, the image pickup device-holding frame 9 has wall portions 9c arranged at four locations corresponding to the corners 101a of the optical filter 101, for positioning the optical filter 101 within a plane orthogonal to the optical axis of the optical filter 101. In other words, the wall portions 9c are opposed to the corners 101a in a direction orthogonal to the optical axis direction. The corners 101a of the optical filter 101 are positioned in the optical axis direction by being brought into abutment with the abutment surface 9b and are positioned within the plane orthogonal to the optical axis direction by the wall positions 9c.

The periphery of the opening portion formed in the sealing member 102 is brought into contact with a reverse surface (surface opposed to the image pickup device 100) of the optical filter 101 along the outer shape of the optical filter 101, and a space between the optical filter 101 and the image pickup device 100 is sealed by the sealing member 102. The sealing member 102 has four positioning protrusions 102a corresponding to the four sides 101b of the optical filter 101. The four positioning protrusions 102a are each formed to have a fixed length outside the optical filter 101 along the outer shape (four sides) of the optical filter 101, within a range in which each positioning protrusion 102a is not brought into contact with the image pickup device-holding frame 9, and to extend in the optical axis direction.

The sealing member 102 is sandwiched and held between the image pickup device 100 and the optical filter 101 in the optical axis direction, and positioned within a plane orthogonal to the optical axis direction with respect to the optical filter 101 positioned with respect to the image pickup device-holding frame 9 as described above. The image pickup device 100 is disposed by elastically deforming the sealing member 102, and the sealing member 102 applies an elastic repulsion force generated by elastic deformation thereof to the optical filter 101 and the image pickup device 100. The optical filter 101 is always pressed against the abutment surface 9b of the image pickup device-holding frame 9 by the elastic repulsion force received from the sealing member 102. The image pickup device 100, after its position and tilt have been adjusted in the optical axis direction, is fixed to the image pickup device-holding frame 9 at a proper position within the adjusted range e.g. by bonding.

Figure 6A:
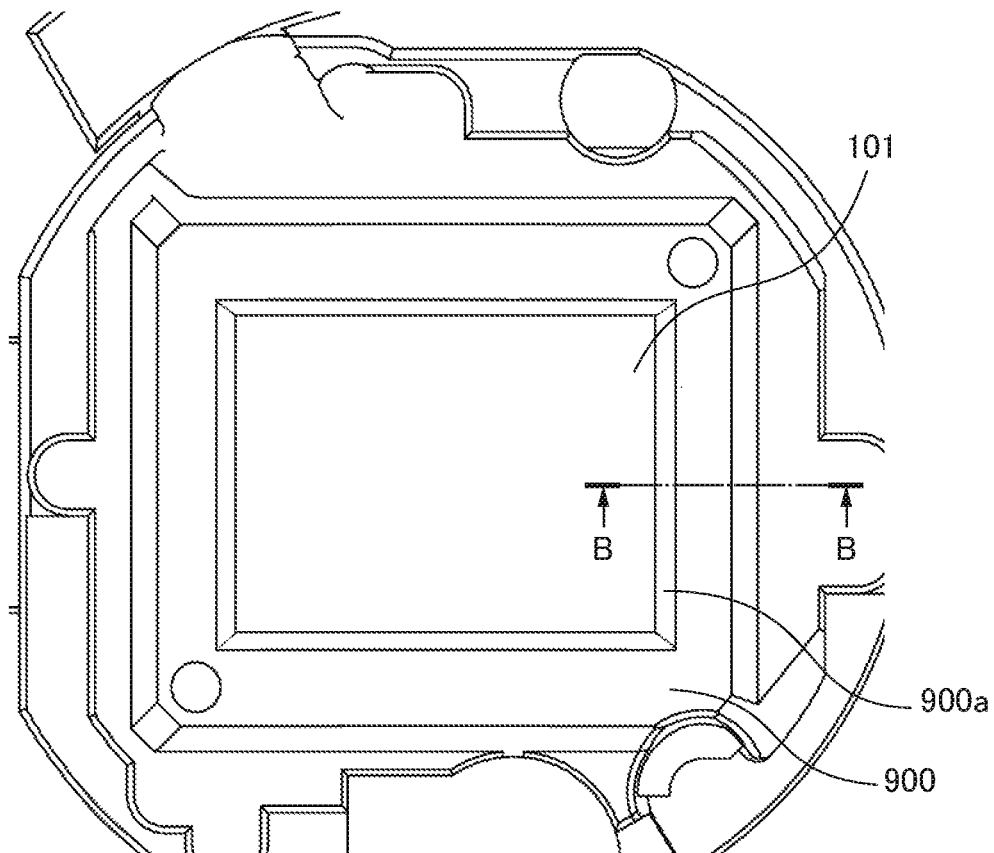
FIGS. 6A and 6B are a front view and a cross-sectional view each showing a structure surrounding a conventional image pickup device.
Figure 6B:
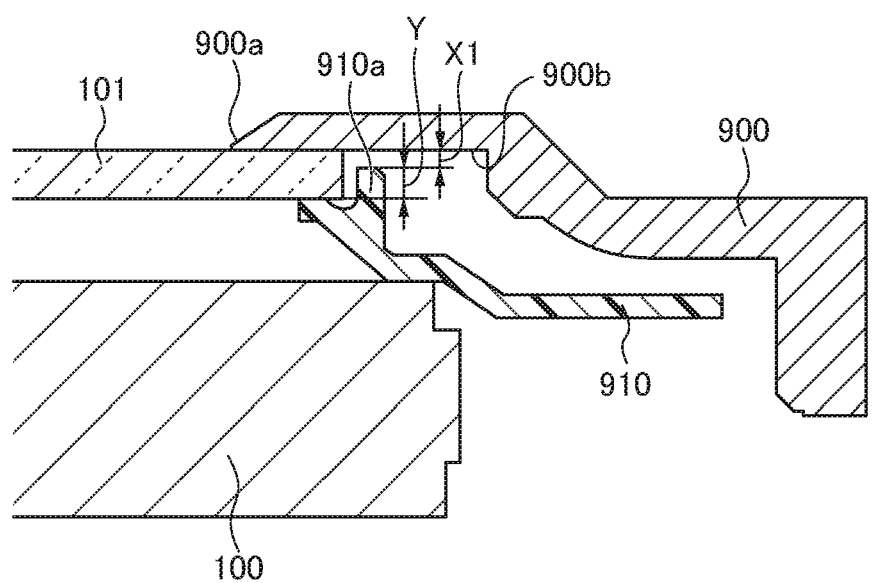

Next, a comparison is made between the arrangement according to the first embodiment, shown in FIGS. 5A and 5B, and a conventional arrangement. FIG. 6A is a front view of a conventional arrangement of the image pickup device 100 and components associated therewith, as viewed from the object side in the optical axis direction, and FIG. 6B is a cross-sectional view taken along B-B in FIG. 6A. A conventional image pickup device-holding frame 900 has an opening portion 900a having a rectangular shape and an abutment surface 900b formed on the entire periphery in association with the corners 101a and the sides 101b of the optical filter 101. A sealing member 910 disposed with respect to the image pickup device-holding frame 900 has a positioning protruding portion 910a arranged outward of the opening portion 900a. That is, as shown in FIG. 6B, the abutment surface 900b exists directly above the positioning protruding portion 910a of the sealing member 910 in the optical axis direction, in other words, the positioning protruding portion 910a and the abutment surface 900b are opposed to each other in the optical axis direction.

Here, since the sealing member 910 is formed of the elastic material, the sealing member 910 is elastically deformed when the image pickup device 100 is assembled or when the position of the image pickup device 100 is adjusted. For this reason, if a clearance X1 in the optical axis direction between the positioning protruding portion 910a and the abutment surface 900b is insufficient, the positioning protruding portion 910a and the abutment surface 900b are brought into contact with each other. If the positioning protruding portion 910a and the abutment surface 900b are thus brought into contact with each other, the elastic repulsion force by the sealing member 910 becomes larger than required, so that the image pickup device 100 becomes liable to peel off from the image pickup device-holding frame 900.

On the other hand, if the length of the positioning protruding portion 910a in the optical axis direction is reduced so as to make the clearance X1 sufficient, it is impossible to sufficiently secure a hitching amount Y in the optical axis direction depending on the thickness of the optical filter 101. If it is impossible to sufficiently secure the hitching amount Y, the optical filter 101 may climb on the positioning protruding portion 910a or like other inconvenience may be caused, during assembly operation, which lowers the workability.

Further, it is necessary to make the opening portion 900a formed in the image pickup device-holding frame 900 for guiding light flux to the image pickup device 100 smaller than the optical filter 101. For this reason, in the case of an image pickup apparatus having a retractable photographing optical system, the thickness of the image pickup device-holding frame 900 for determining the position the optical filter 101 in the optical axis direction narrows a space of the photographing optical system in the retracted state in the optical axis direction.

On the other hand, in the arrangement according to the first embodiment, shown in FIGS. 5A and 5B, the opening portion 9a of the image pickup device-holding frame 9 has a circular shape, and the diameter of the opening portion 9a is shorter than the length of a diagonal line of the optical filter 101 and longer than one long side of the optical filter 101. This makes it possible to arrange the positioning protrusions 102a of the sealing member 102 inside the opening portion 9a while securing the abutment surface 9h, which is brought into contact with the four corners of the optical filter 101 in the optical axis direction, at the four corners. As a result, a structure is obtained in which the positioning protrusions 102a are not opposed to the abutment surface 9b in the optical axis direction, and hence the sealing member 102 is prevented from being brought into contact with the abutment surface 9b even when the sealing member 102 is largely elastically deformed. With this, it is possible to set the elastic repulsion force applied by the sealing member 102 to a proper magnitude. Further, even in a case where the optical filter 101 is thin, by arranging positioning protrusions 102a' which are long in the optical axis direction, as indicated by a broken line in FIG. 5B, it is possible to sufficiently secure the hitching amount Y. Note that there arises no problem even if a front end of each positioning protrusion 102a' protrudes forward (toward the object) more than the abutment surface 9b in the optical axis direction.

Figure 7:
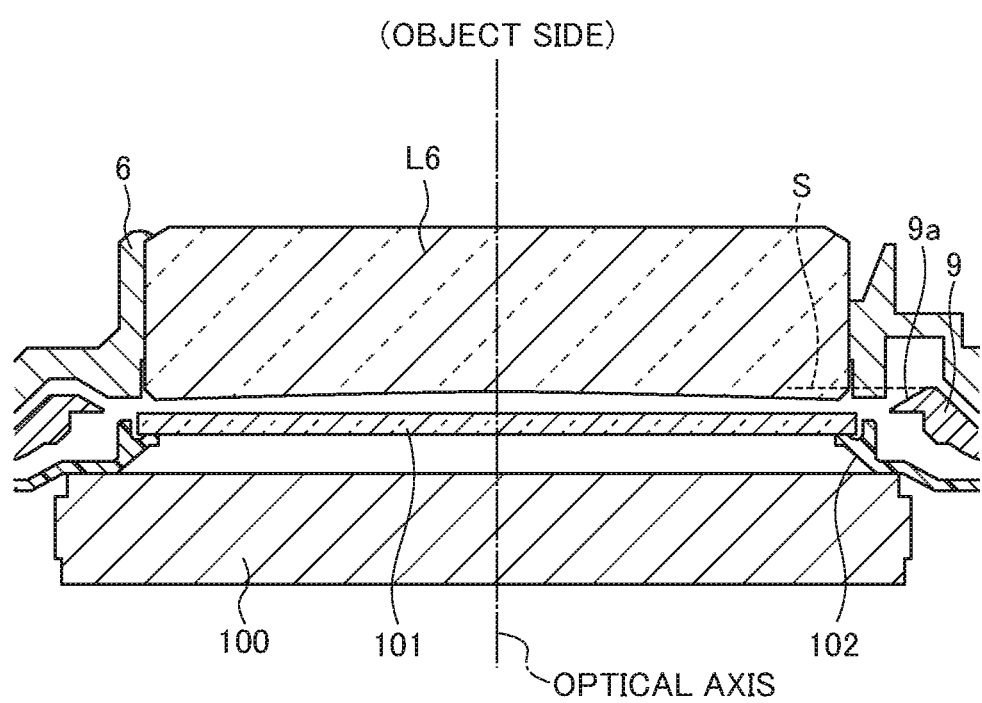
FIG. 7 is a cross-sectional view of a sixth-group holding frame in a state retracted into an image pickup device-holding frame.

Further, since the opening portion 9a of the image pickup device-holding frame 9 has the circular shape, it is possible to move at least one of the sixth-group lens L6 (second optical member) and the sixth-group holding frame 6 (second holding member), which are disposed closer to an object than the optical filter 101, into the opening portion 9a when retraced. FIG. 7 is a cross-sectional view of the sixth-group lens L6 and the sixth-group holding frame 6 in a state retracted toward the image pickup device-holding frame 9. There is provided an area by which the sixth-group lens L6 and the sixth-group holding frame 6 can be retracted toward the image pickup device 100 further than a broken line S indicating a front end position of the image pickup device-holding frame 9 toward an object. In other words, it is possible to configure the photographing optical system such that at least one of the sixth-group lens L6 and the sixth-group holding frame 6 overlaps with the image pickup device-holding frame 9, in a state in which the sixth-group holding frame 6 is made closer to the image pickup device-holding frame 9, as viewed in a direction (second direction) orthogonal to the optical axis direction. This makes it possible to reduce the length of the photographing optical system in the retracted state.

Figure 8A:
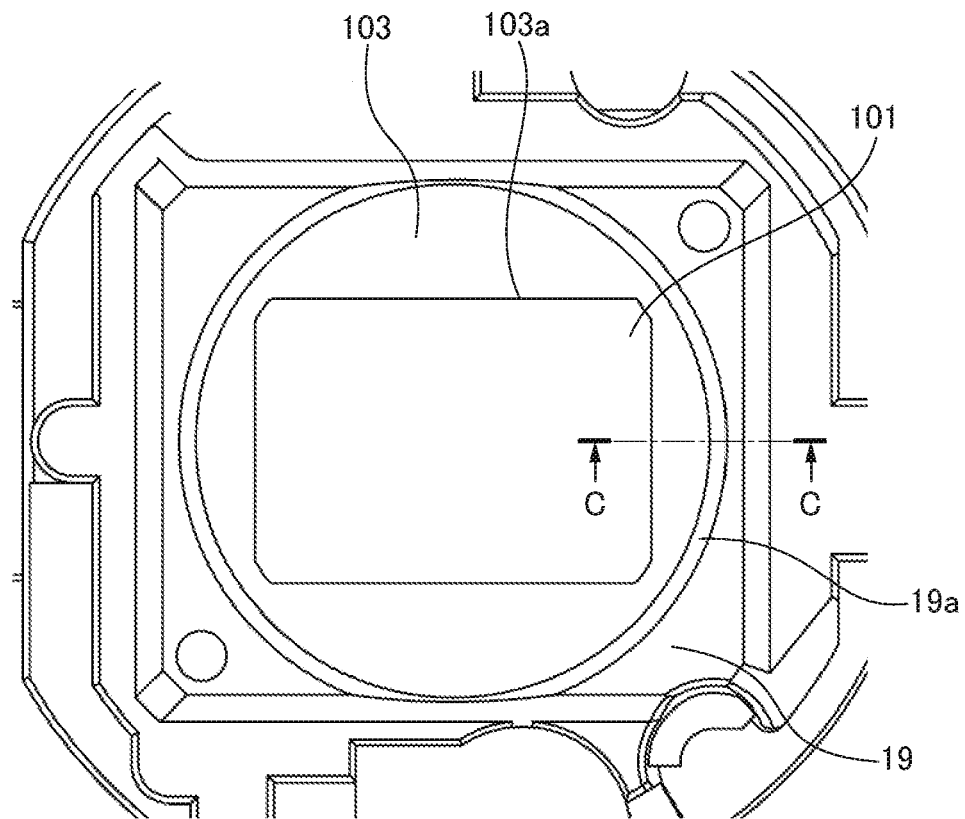
FIGS. 8A and 8B are a front view and a cross-sectional view each showing a structure surrounding the image pickup device according to a second embodiment.
Figure 8B:
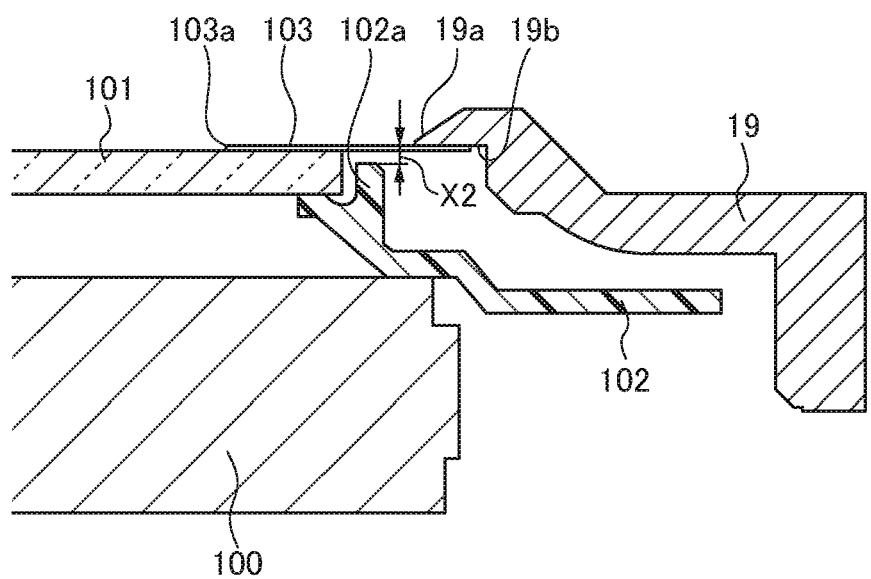

Next, a description will be given of a structure surrounding the image pickup device 100 according to a second embodiment. FIG. 8A is a front view of the image pickup device 100 and components associated therewith, according to the second embodiment, as viewed from the object side in the optical axis direction, and FIG. 8B is a cross-sectional view taken along C-C in FIG. 8A, in the second embodiment, a light shielding mask 103 (light shielding member) in the form of a sheet having a rectangular opening portion 103a is arranged between the front surface (surface on the object side) of the optical filter 101 and an abutment surface 19b of an image pickup device-holding frame 19. By providing the light shielding mask 103 having the rectangular opening portion 103a which is smaller in area than an opening portion 19a of the image pickup device-holding frame 19, it is possible to shield light causing light leakage, ghost artifacts, or the like.

Note that in the arrangement of the second embodiment, a clearance X2 between each positioning protrusion 102a of the sealing member 102 and the light shielding mask 103 may be made small. This is because even when the sealing member 102 is elastically deformed to be brought into contact with the light shielding mask 103, only the light shielding mask 103 is deformed but the elastic repulsion force applied by the sealing member 102 does not increase, and hence, the elastic repulsion force is prevented from being applied to the image pickup device 100 more than required.

As described above, in the embodiments, the opening portion of the image pickup device-holding frame is formed into the circular shape having the diameter shorter than the diagonal line of the optical filter and longer than the long side of the optical filter. This makes it possible to form the positioning protrusions of the sealing member inside the opening portion of the image pickup device-holding frame while securing the abutment surface, which is brought into contact with the four corners of the optical filter in the optical axis direction, at the four corners. As a result, it is possible to maintain the positioning accuracy of the sealing member and apply a proper elastic repulsion force to the image pickup device even when position adjustment of the image pickup device is performed. Further, it is possible to cause another optical member to enter the opening portion of the image pickup device-holding frame, which makes it possible to realize size reduction of the photographing optical system in the retracted state.

The present invention has been described heretofore based on the suitable embodiments thereof. However, the present invention is not limited to these embodiments, but it is to be understood that the invention includes various forms within the scope of the gist of the present invention. Further, the embodiments of the present invention are described only by way of example, and it is possible to combine the embodiments on an as needed basis. For example, although in the above-described embodiments, the image pickup apparatus equipped with the retractable photographing optical system has been described, the present invention can also be applied to an image pickup apparatus equipped with a non-retractable photographing optical system and a lens-interchangeable image pickup apparatus main body.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-182376 filed Sep. 27, 2018, which is hereby incorporated by reference herein in its entirety.

What is claimed is:

1. An image pickup apparatus comprising:
   an image pickup device;
   a first holding member configured to hold the image pickup device;

a first optical member that is disposed on an object side of the image pickup device in an optical axis direction of a photographing optical system; and
a sealing member that is sandwiched and held between the first optical member and the image pickup device,
wherein the first holding member includes:
an opening portion for guiding light flux having passed through the photographing optical system to the image pickup device; and
an abutment surface that is brought into contact with part of the first optical member,
wherein the sealing member has protrusions each extending toward the object side in the optical axis direction, along an outer shape of the first optical member inside the opening portion of the first holding member, as viewed in the optical axis direction,
wherein an elastic repulsion force generated by elastic deformation of the sealing member is applied to the image pickup device and the first optical member,
wherein a part of the sealing member overlaps with the outer shape of the first optical member in the optical axis direction, and
wherein an opening edge of the opening portion of the first holding member does not overlap with an edge of object side of the sealing member, as viewed in the optical axis direction.

2. The image pickup apparatus according to claim 1, further comprising:
a light shielding member in the form of a sheet that is arranged between a front surface of the first optical member and the abutment surface of the first holding member, and has an opening portion which is smaller than the opening portion of the first holding member,
wherein the protrusions are arranged outside the opening portion of the light shielding member, as viewed in the optical axis direction.

3. The image pickup apparatus according to claim 1, wherein a front end of each protrusion is located forward of the abutment surface in the optical axis direction.

4. An image pickup apparatus comprising:
an image pickup device;
a first holding member configured to hold the image pickup device;
a first optical member that is disposed forward of the image pickup device in a first direction orthogonal to an image pickup surface of the image pickup device; and
a sealing member that is sandwiched and held between the first optical member and the image pickup device,
wherein the first holding member includes:
an opening portion for guiding light flux having passed through a photographing optical system to the image pickup device; and
an abutment surface that is brought into contact with part of the first optical member,
wherein the sealing member has protrusions each extending forward in the first direction, along an outer shape of the first optical member inside the opening portion of the first holding member, as viewed in the first direction,
wherein the first optical member has a rectangular shape,
wherein the opening portion of the first holding member has a circular shape having a diameter which is shorter than a diagonal line of the first optical member and longer than a long side of the first optical member, and
wherein the abutment surface is provided on the first holding member such that the abutment surface is brought into contact with corners of the first optical member.

5. The image pickup apparatus according to claim 4, wherein the first holding member has wall portions opposed to the corners of the first optical member in a direction orthogonal to the first direction.

6. The image pickup apparatus according to claim 4, further comprising:
a second optical member that is disposed forward of the first optical member in the first direction,
a second holding member configured to hold the second optical member, and
a moving unit configured to move the second holding member in the first direction, and
wherein at least one of the second optical member and the second holding member overlaps with the first holding member, in a state in which the second holding member is made closer to the first holding member in the first direction, as viewed in a second direction orthogonal to the first direction.

* * * * *